No. 800,808. PATENTED OCT. 3, 1905.
C. E. LINDBERG.
HORSE HAY RAKE.
APPLICATION FILED JUNE 1, 1905.
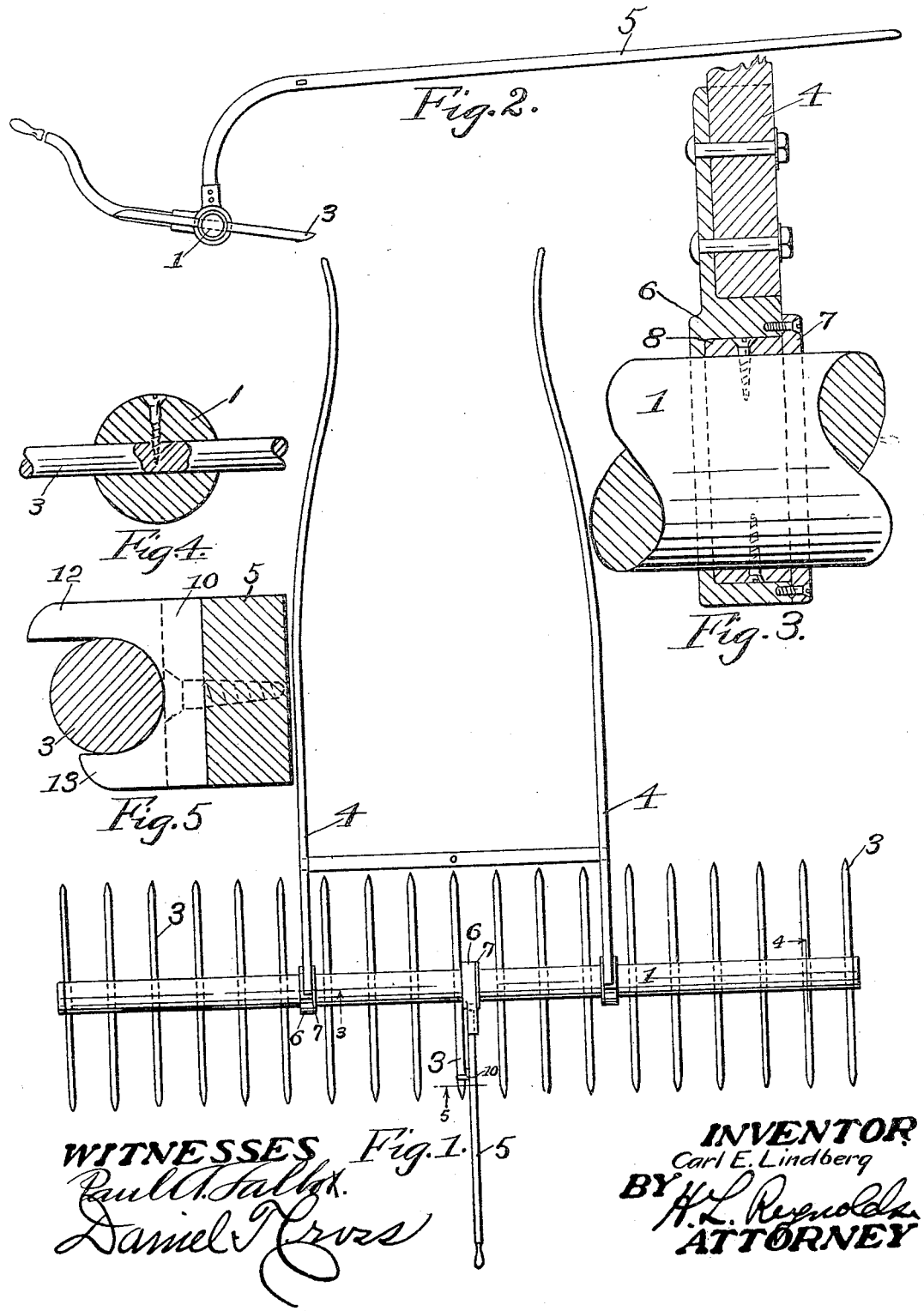

UNITED STATES PATENT OFFICE.

CARL E. LINDBERG, OF SEATTLE, WASHINGTON.

HORSE HAY-RAKE.

No. 800,808.  Specification of Letters Patent.  Patented Oct. 3, 1905.

Application filed June 1, 1905. Serial No. 263,327.

*To all whom it may concern:*

Be it known that I, CARL E. LINDBERG, a subject of the King of Sweden and Norway, and a resident of the city of Seattle, county of King, and State of Washington, have invented certain new and useful Improvements in Horse Hay-Rakes, of which the following is a specification.

My invention relates to an improvement in horse hay-rakes, and comprises the novel parts and combinations of parts hereinafter described, and particularly pointed out in the claims.

The object of my invention is to improve and simplify such devices, and particularly to decrease the cost thereof.

In the drawings accompanying herewith I have shown my invention and have herein described the same in the form which is now preferred by me.

Figure 1 is a plan view of my invention. Fig. 2 is an elevation of the same from one side. Fig. 3 shows the construction of the journal used for connecting the draft mechanism and the tilting-lever to the main bar. Fig. 4 is a section through the bar on a line with one of the teeth, and Fig. 5 shows the device for engaging a tooth by the tilting-lever in order to control the action of the rake.

My invention comprises a main bar 1, preferably of round cross-section, having a series of teeth 3 extending therefrom in opposite directions. Preferably this bar and the teeth would be constructed of wood.

The draft mechanism, herein shown as consisting of a pair of shafts 4, is connected with the bar 1 by journals which will permit the rake to turn over when desired. The preferred construction is clearly shown in Fig. 3 and consists of a band or ring 8, which is secured to the bar 1, and a casting 6, which is formed of a band adapted to embrace the ring 8 and provided on one side with a flange adapted to engage the edge of the ring 8. This is secured in place by means of a flange or ring 7, which is secured to the casting 6. The casting 6 is provided with means by which the shaft or the tilting-lever, as the case may be, is secured thereto.

The tilting-lever 5 extends rearward from the bar 1 and has a small casting or catch 10 secured thereto at such a distance from the center that it may engage one of the teeth 3 near its end. This catch has two fingers 12 and 13, located, respectively, at top and bottom thereof and separated sufficiently to accommodate the tooth 3 between them. The lower finger 13 is the shorter of the two and preferably has its lower surface rounded to facilitate the passage of the tooth 3 into place after the rake has been reversed. The upper finger 12 being longer than the lower finger will engage the tooth 3 and stop it after reversal and after it has passed the lower finger 13.

In operation the forward teeth tilt downward until they contact with the ground, but being rounded on their ends they are not likely to dig into the ground with sufficient force to turn the rake. Should there be any tendency of this sort, this may be counteracted by a downward pressure upon the tilting-lever 5. When, however, it is desired to reverse the rake, either to dump the load of collected hay or to pass over an obstruction, this may be done by raising the rear end of the tilting-lever, which will cause the forward ends of the teeth to dig into the ground and the rake thereby be reversed. As soon as this action has been started the tilting-lever may be freed from its tooth by a slight lateral motion. To permit this, its journal connection with the bar 1 should be sufficiently loose to permit the required amount of side motion.

The construction described is evidently one which is very cheap to make and one which may be kept in repair by the average farmer with such tools as he is apt to have on hand. It is also a very effective rake and may also be operated to advantage even in rough ground containing stones or stumps, if these be not too large.

The peculiar construction of the journal connection with the bar 1, in which the flanges on each side of the ring 8 are carried by the shaft, prevents the possibility of the hay being wound into the journal, as it would be if the flange were secured to the bar 1. The shafts and the lever 5 are secured to their castings by bolts, which may be easily removed, thus freeing the shafts and lever and making it possible to store the rake away in a small space and wherever desired.

What I claim, and desire to secure by Letters Patent, is—

1. A horse hay-rake comprising a bar having oppositely-projecting teeth, a draft mechanism journaled on said bar to permit the bar to turn over, a controlling-lever journaled on said bar, and a yoke-like or notched member secured to said lever and having its opening extending laterally and adapted to embrace one of the teeth.

2. A horse hay-rake comprising a bar having oppositely-projecting teeth, a draft mechanism journaled upon said bar, a controlling-lever journaled on said bar, and a pair of fingers carried by said lever and projecting laterally to embrace a tooth of the rake, the lower of said fingers being the shorter and having a beveled lower end surface.

3. A horse hay-rake comprising a bar having oppositely-projecting rake-teeth, rings secured to the bar, a draft mechanism having members journaled on the said rings, and flanges secured to said journaled members and engaging the edges of said rings, one of said flanges for each member being removable.

4. A horse hay-rake comprising a bar having oppositely-projecting rake-teeth, rings secured to the bar, a draft mechanism having members journaled on the said rings, and flanges secured to said journaled members and engaging the edges of said rings, one of said flanges for each member being removable, and means for controlling the tilting action of the rake by hand.

In testimony whereof I have hereunto affixed my signature, this 2d day of May, 1905, in the presence of two witnesses.

CARL E. LINDBERG.

Witnesses:
H. L. REYNOLDS,
PAUL A. TALBOT.